(12) United States Patent
Wang et al.

(10) Patent No.: US 10,459,158 B2
(45) Date of Patent: Oct. 29, 2019

(54) FEW-MODE OPTICAL FIBER

(71) Applicants: STATE GRID JIANGXI ELECTRIC POWER COMPANY INFORMATION & TELECOMMUNICATION BRANCH, Nanchang (CN); STATE GRID CORPORATION OF CHINA, Beijing (CN); JIANGSU UNIVERSITY, Zhenjiang (CN)

(72) Inventors: Hua Wang, Nanchang (CN); Mingyang Chen, Nanchang (CN); Ping Yin, Nanchang (CN); Luming Li, Nanchang (CN); Jin Wei, Nanchang (CN); Jihai Yang, Nanchang (CN); Zhimin Cai, Nanchang (CN); Yuanfeng Zhu, Nanchang (CN); Hui Tian, Nanchang (CN)

(73) Assignees: STATE GRID JIANGXI ELECTRIC POWER COMPANY INFORMATION & TELECOMMUNICATION BRANCH, Nanchang (CN); STATE GRID CORPORATION OF CHINA, Beijing (CN); JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 16/072,864

(22) PCT Filed: Jan. 19, 2017

(86) PCT No.: PCT/CN2017/071757
§ 371 (c)(1),
(2) Date: Jul. 25, 2018

(87) PCT Pub. No.: WO2017/129039
PCT Pub. Date: Aug. 3, 2017

(65) Prior Publication Data
US 2018/0375578 A1    Dec. 27, 2018

(30) Foreign Application Priority Data
Jan. 28, 2016    (CN) .......................... 2016 1 0061152

(51) Int. Cl.
*G02B 6/036*    (2006.01)
*G02B 6/02*    (2006.01)
(Continued)

(52) U.S. Cl.
CPC ......... *G02B 6/03688* (2013.01); *G02B 6/028* (2013.01); *G02B 6/02009* (2013.01);
(Continued)

(58) Field of Classification Search
None
See application file for complete search history.

(56) References Cited

U.S. PATENT DOCUMENTS

| | | | | |
|---|---|---|---|---|
| 4,877,304 A * | 10/1989 | Bhagavatula | ...... | G02B 6/02228 385/124 |
| 2002/0164140 A1* | 11/2002 | Lysiansky | ...... | G02B 6/02019 385/127 |

(Continued)

*Primary Examiner* — Michelle R Connelly
(74) *Attorney, Agent, or Firm* — Hemisphere Law, PLLC; Zhigang Ma

(57) ABSTRACT

The refractive index of a fiber core of a few mode optical fiber is n1. A cladding layer surrounding the fiber core includes: a downward-concave cladding layer surrounding the fiber core, the refractive index thereof is n2; a first upward-convex cladding layer surrounding the downward-concave cladding layer, the refractive index thereof is n3; a second upward-convex cladding layer surrounding the first upward-convex cladding layer, the refractive index thereof is n4; an outer layer surrounding the second upward-convex cladding layer, the refractive index thereof is n5. The refrac- (Continued)

tive indexes of the fiber core, the downward-concave cladding layer, the first upward-convex cladding layer, the second upward-convex cladding layer, the outer layer satisfy: $n_1 > n_3 > n_4 > n_5 > n_2$. The fiber is a non-single mode in a direct waveguide state, and equivalent single-mode transmission can be achieved when the optical fiber is bent at a specific bending radius.

9 Claims, 3 Drawing Sheets

(51) Int. Cl.
    *G02B 6/028*      (2006.01)
    *G02B 6/10*      (2006.01)
    *H04B 10/25*      (2013.01)

(52) U.S. Cl.
    CPC .............. *G02B 6/036* (2013.01); *G02B 6/10* (2013.01); *H04B 10/25* (2013.01)

(56) References Cited

U.S. PATENT DOCUMENTS

2016/0223743 A1\*   8/2016   Sillard ................ G02B 6/0288
2019/0162899 A1\*   5/2019   Wang ................ G02B 6/03688

\* cited by examiner

Difference between the outer cladding layer and the downward-concave cladding layer: $n_5-n_2$ Difference of the outer cladding layer and the downward-concave cladding layer: $n_5-n_2$

FEW-MODE OPTICAL FIBER

BACKGROUND OF THE INVENTION

1. Field of the Invention

The present invention relates to an optical fiber communication technical field, and in particular to a few-mode optical fiber that provides low bending loss for the fundamental mode and is capable of achieving equivalent single-mode transmission.

2. Description of Related Art

With science and technology of the optical fiber communication technology widely applied to the people's daily life and work, it brought great convenience for people's daily life and work, becomes indispensable technology in people's daily life and work.

Conventional single-mode optical fibers can work with moderate bending radius. However, in current daily life, the MAN (metropolitan area network), LAN (local area network), FTTH (fiber-to-the-home), and short distance communication have been popularly applied in people's daily life and work. The optical fiber should be able to work at small bending radius for flexible wiring and decreasing space occupied by the optical fiber. The conventional G.657 optical fiber can work with small bending radius of 30 mm. The MAN (metropolitan area network), LAN (local area network), FTTH (fiber-to-the-home), and short distance communication require lower bending radius, the G.657 optical fiber cannot satisfy this demand. Although the G.657 optical fibers can work at small bending radius of 7.5 or even 5 mm, for solving problem in the G.652 optical fiber with the G.657 optical fiber, which is presented in the international, bending loss at the small bending radius is generally too high to allow for multiple winding.

According to optical fiber mode theory, the step-index optical fiber can be single-mode guided if the normalized frequency is lower than 2.405 at the working, wavelength. If the normalized frequency is higher than 2.405, the high-order modes will appear in the optical fiber, leading to multi-mode operation. The high-order modes of the multi-mode operation will lead to serious modal dispersion for the signals propagating in the optical fibers, as a result, the communication velocity and capacity of the systems will be seriously reduced. So far, single-mode optical fibers are widely used in optical fiber communication systems. Conventional G.652 and G.657 optical fibers have a cutoff wavelength of 1260 nm or lower. That is, the cutoff wavelength is shorter than communication wavelength thereof, and thus such fibers are single-mode guided.

The multi-mode optical fiber is provided as an optical fiber, for enlarging refractive index difference between the optical fiber core and the cladding layer, and then single-mode operation can be achieved by simply connecting with the single-mode optical fiber ["An optical fiber communication system", Chinese Patent No. 201010589018.1; "A few-mode optical fiber based communication system", Chinese Patent No. 201210393511.5]. By relaxing the limit of the number of modes in the optical fiber, this technique inhibits the generation of high-order modes by connecting with the single mode fiber, and realizes the requirements of low bending loss, single mode transmission and low connection loss transmission. However, the method is rigid for connection accuracy of two ends of the few-mode optical fiber respectively to a single-mode optical fiber, which limits its practical applications.

Therefore, there is a problem to be solved to provide single-mode guided few-mode optical fibers, in which the fundamental modes have low splicing loss and small bending radius.

SUMMARY OF THE INVENTION

To solve the problem described above, therefore, a few-mode optical fiber is provided in the present invention, which is single-mode guided and remains low splicing loss at small bending radius.

To achieve above object, a technology approach is provided as follows in accordance with the present invention:

An optical fiber comprises:

a core and a cladding layer surrounding the fiber core, wherein the refractive index of the fiber core is $n_1$.

The cladding layer comprises: a downward-concave cladding layer surrounding the fiber core, the refractive index thereof is $n_2$; a first upward-convex cladding layer surrounding the downward-concave cladding layer, the refractive index thereof is $n_3$; a second upward-convex cladding layer surrounding the first upward-convex cladding layer, the refractive index thereof is $n_4$; an outer layer surrounding the second upward-convex cladding layer, the refractive index thereof is $n_5$.

The refractive indexes of the fiber core, the downward-concave cladding layer, the first upward-convex cladding layer, the second upward-convex cladding layer, the outer layer satisfy: $n_1 > n_3 > n_4 > n_5 > n_2$. The parameter between the fiber core and the downward-concave cladding layer is defined by F, with F=8.0 μm~10.0 μm, where $F=2(0.65+1.62V^{-3/2}+2.88V^{-6})a_1$, and $$V = \frac{2\pi a_1}{\lambda_0}(n_1^2 - n_2^2)^{1/2},$$

where V denotes the normalized frequency, $a_1$ denotes the core radius, and $\lambda_0$=1310 nm and 2.9<V<5.

Preferably, the above optical fiber has a cutoff wavelength of more than 1.625 μm.

Preferably, in the above optical fiber, the refractive index of the first upward-convex cladding layer should meet the condition of $n_3 < n_{01}/(1+0.78d_c/R_b)$, where $n_{01}=n_2(1.1428-0.9960/V)^2(n_1-n_2)/n_1)$ and the normalized frequency:

$$V = \frac{2\pi a_1}{\lambda_0}(n_1^2 - n_2^2)^{1/2};$$

where $d_c$ is defined as the center distance between the fiber core and the first upward-convex cladding layer with $d_c=a_1+a_2+a_3/2$, and $R_b$=7.5 mm; where $a_2$, $a_3$ are the radial width of the downward-concave cladding layer and the first upward-convex cladding layer, respectively.

Preferably, the index difference between the fiber core and the downward-concave cladding layer in the optical fiber falls within the following ranges: $0.015 \geq n_1 - n_2 \geq 0.0051$; the index difference between the downward-concave cladding layer and the first upward-convex cladding layer falls within the following ranges: $0.006 \geq n_3 - n_2 \geq 0.0015$; the index difference between the first and second upward-convex cladding layers falls within the following ranges: $0.002 \geq n_3 - $ $n_4>0$; the index difference between the downward-concave cladding layer and the outer cladding, layer falls within the following ranges: $0.004 \geq n_5-n_2 \geq 0.001$.

Preferably, in the optical fiber, core radius $a_1$, width of the downward-concave cladding layer $a_2$ and radial thickness of first upward-convex cladding layer $a_3$ fall within the following ranges: 7.5 µm≥$a_1$≥4 µm, 8.5 µm≥$a_2$≥3.6 µm, and 15 µm≥$a_3$≥5.5 µm, respectively.

Preferably, in the optical fiber, the relationship between the radial widths of the first and second upward-convex cladding layers should meet the condition of $4 \geq a_3/a_4 \geq 2$, where $a_4$ is the width of the second upward-convex cladding layer.

Preferably, in the optical fiber, the second upward-convex cladding layer has a parabolic structure. The refractive index distribution of the second upward-convex cladding layer at the radius r of the optical fiber satisfies:

$$n(r)=\sqrt{n_4^2-(n_4^2-n_5^2)((r-a_1-a_2-a_3)/a_4)^2}, \text{ where}$$
$$a_1+a_2+a_3+a_4 \geq r \geq a_1+a_2-a_3.$$

Preferably, the bending loss of the LP01 mode in the optical fiber at a wave length of 1550 nm is less than 0.01 dB/turn for bending radius $R_b \geq 7.5$ mm, and the bending loss of the $LP_{11}$ mode in the optical fiber is larger than 1 dB/turn for bending radius $R_b \leq 10$ mm, Preferably, in the optical fiber, the mode field diameter F of the optical fiber at the wavelength of 1310 nm is 8.6 µm~9.5 µm.

In accordance with the above technology solutions, the present invention provides few-mode optical fiber. The optical fiber comprised: a core and a cladding layer surrounding the fiber core. The cladding layer comprises: a downward-concave cladding layer surrounding the fiber core; a first upward-convex cladding layer surrounding the downward-concave cladding layer; a second upward-convex cladding layer surrounding the first upward-convex cladding layer; an outer layer surrounding the second upward-convex cladding layer. The first and second upward-convex cladding layers form a defect layer, for a defect mode transmission. The optical fiber is a non-single mode in a direct waveguide state. Bending the optical fiber at specified bending radius can induce high mode coupling between the higher-order modes in the fiber core and the leaky defect modes in the cladding layer, as a result, the higher-order modes can be filtered out, leading to effectively single-mode guided operation. The defect layer has a lower effective refractive index in the direct waveguide state, and thus influence on the optical fundamental mode is decreased, thereby achieving low bending loss transmission for the fundamental mode. In the present invention, the optical fiber has the advantages of low bending loss and low splicing loss in the few-mode optical fiber without special demands for the fibers connection, in additional, it can achieve the single-mode transmission and works with low bending loss at small bending radius.

SUMMARY OF THE DRAWING(S)

The present invention will now be described in detail through several embodiments with reference to the accompanying drawings.

DETAILED DESCRIPTION OF EMBODIMENTS OF THE PRESENT INVENTION

Figure 1:
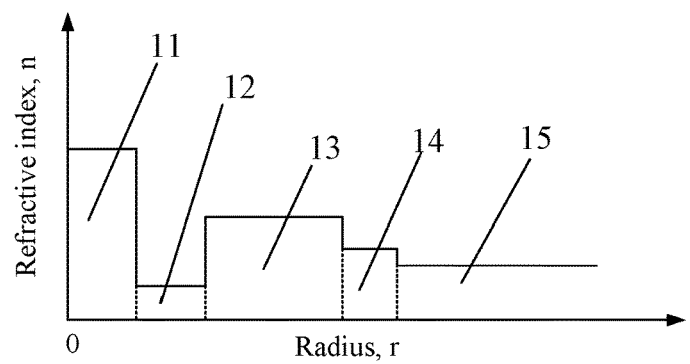
FIG. 1(a) is a schematic diagram of radial refractive index distribution of a few-mode optical fiber according to an embodiment of the present invention.
FIG. 1(b) is a schematic cross-sectional view of a few-mode optical fiber according to an embodiment of the present invention.
Figure 1:
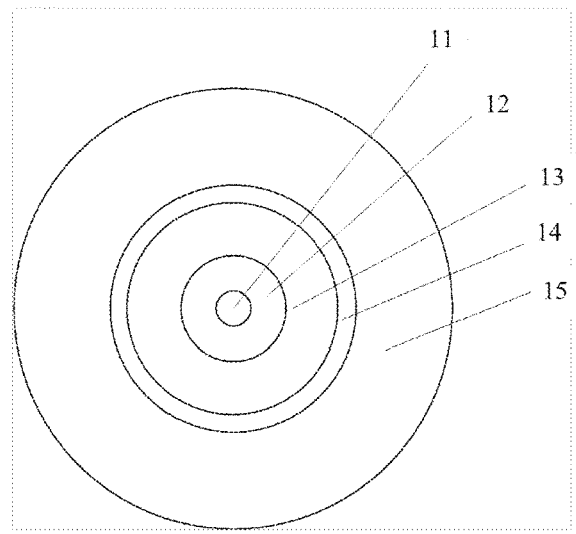

The invention will now be described in detail through several embodiments with reference to the accompanying drawings. While the present invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

According to bending theory for the optical fiber, the optical fiber is equivalent as a direct waveguide in a bending form, with the refractive indexes superimposed an excitation on the refractive index distribution of the original optical fiber. That is, the refractive index distribution of the equivalent direct waveguide is expressed as:

$$n(x, y) = n_0(x, y)\left(1 + (1 + \chi)\frac{x}{R_b}\right),$$

where $n_0(x,y)$ is the refractive index distribution along a cross-sectional direction of the optical fiber without bending, n (x,y) is the refractive index distribution of the equivalent direct waveguide, $\chi$ is elastic-optic coefficient of the material, and R is bending radius of the optical fiber. It is realized from the formula that the refractive indexes of the outer edge in the fiber core and the cladding layer are increased depending on the bending of the optical fiber, and the less the bending radius is, the more the refractive index is increased. Further, the more the distance away from the fiber core is, the more the refractive index is increased. Thus, this bending has a little influence on the transmission mode in the fiber core. When the bending radius is reduced to be a predetermined degree, the parts with higher refractive indexes in the cladding layer are become closer and closer to the fiber core until the transmission modes which are previously happened in the fiber core are transferred to the cladding layer, accordingly resulting in light leakage.

It is obvious that the bending loss of the fundamental-mode in the optical fiber can be reduced by increasing the index difference of the fiber core and the cladding layer. However, for an optical fiber with step-index profile, increase of the refractive index difference between the fiber core and the cladding layer will lead to the increase of the normalized frequency. According to the normalized frequency formula:

$$V = \frac{2\pi a_1}{\lambda_0}(n_1^2 - n_2^2)^{1/2},$$

a high order modes will appear in the optical fiber when V is larger than 2.405. In order to guarantee the single mode output of the optical fiber and achieve high speed and large capacity optical communication, measures should be taken to remove the high-order mode in the optical fiber.

In theory, the defect mode is generated by setting the defect layer in the cladding layer. If the effective index of the defect mode is approximate or equal to an effective index of certain mode in the fiber core, the two modes will induce high mode coupling. This means can achieve the selective mode filtering for the fundamental-mode of the optical fiber and realize the single-polarization optical transmission [Optics Letters, 2008, 33(21): 2542-2544]. It is obvious that the higher-order modes can be filtered out of the few-mode optical fiber. However, this means has the following advantage: if the defect mode is allowed to high-mode couple with the high-order mode in the fiber core at a direct waveguide form, the refractive index of the defect layer far away from the fiber core will be increased at a bending status and accordingly it is easy to induce the high mode coupling of the defect mode with the fundamental-mode of the optical fiber. As such, the bending loss of the fundamental-mode will be increased, namely, the bending resistance property of is decreased.

In order to avoid increase of bending loss in the fundamental-mode of the optical fiber in a result of removal of the high-order mode, a configuration method for an optical fiber, in accordance with this embodiment of the present invention, is provided to solve the problem.

In accordance with the present invention, the optical fiber is configured to achieve filtering and removal of the high-order modes. The configuration means is achieved by designing an optical fiber with low-bending loss for the fundamental mode, and defect layers are introduced in the fiber cladding layer. The defect layers can support some defect modes and the defect modes have high bending losses. The higher-order modes in the fiber core and the defect modes in the cladding layer can be matched by bending the fiber at appropriate bending radius, as a result, the higher-order modes will be coupled to the defect modes and finally, leaked out, accordingly achieving to filter and remove these modes.

The optical fiber is provided with a desired defect layer of the cladding layer so that the effective refractive index of the defect mode in a direct waveguide status is relatively lower and much less than that of the core fundamental mode. In addition, the defect region is kept at an enough distance from the core region, namely, the defect mode won't couple with the high-order mode of the fiber core at the direct waveguide status.

However, refractive indexes of partial regions of the defect modes are increased whilst the optical fiber is bent to a certain bending status. This results in increase of effective indexes of the defect modes. Because the fiber core is in the center of the optical fiber, the change of the refractive index of the fiber core caused by fiber bending is much smaller than that of the cladding layer and the effective refractive indexes of the high-order modes of the fiber core increases slowly. In this way, the effective refractive indexes of the defect modes are close to or equal to the high-order modes at a bent status so that the high-order mode can couple strongly to the defect modes. In this situation, if the leakage loss of the defect modes is large, the high-order modes can be leaked out, thus realizing the single-mode transmission. Both sides of the defect region have a virtue of lower indexes in inner layer than the outer layer, therefore, the bending losses of the defect modes are high. Further, the defect layers should have large area so that the number of defect modes would be large enough and the effective indexes of those modes are extended in a wide range. Therefore, it is possible that the high-order modes in the fiber core can strongly couple with the defect modes.

As shown in FIGS. 1(a) and (b), FIG. 1(a) is a schematic diagram of radial refractive index distribution of an optical fiber according to an embodiment of the present invention; FIG. 1(b) is a schematic cross-sectional view of an optical fiber according to an embodiment of the present invention. The optical fiber below is configured to cause the fundamental mode field distribution of the fiber to meet the requirements of G.652 optical fiber standard. Meanwhile, the index difference between the fiber core 11 and adjacent upward-convex cladding layer 12 is large enough to ensure low bending loss. The defect layers are designed to comprise a first upward-convex cladding layer 13 and a second upward-convex cladding layer 14. Further, the first upward-convex cladding layer 13 is adjacent to the downward-concave cladding layer 12 and the first upward-convex cladding layer 13 has higher refractive index than the second upward-convex cladding layer 14. Then, the outer cladding layer 15 is configured.

The outer cladding layer 15 has higher refractive index than the downward-concave cladding layer 12, namely, the index difference of the defect layer and the outer cladding layer 15 is relatively less than that of the defect layer and the downward-concave cladding layer 12. As such, the defect layers should have low influence on the modes in the fiber core 11 in a direct waveguide status. In bending status, the defect modes are close to the outer cladding layer 15. Since the second upward-convex cladding layer 14 adjacent to the outer cladding layer 15 has a low refractive index, the index difference between the second upward-convex cladding layer 14 and the outer cladding layer 15 is relatively little so as to form large leakage loss. Additionally, the index distribution of the defect layer with internal high indexes and outer low indexes brings out a little influence on the defect modes caused by the variation of the bending radius. Therefore, it is ensured that the high-order modes in the fiber core 11 can couple with the defect modes in a wide bending radius.

It is defined that $n_1, n_2, n_3, n_4, n_5$ denote the refractive index of the fiber core 11, the downward-concave cladding layer 12, the first upward-convex cladding layer 13, the second upward-convex cladding layer 14, an outer cladding layer, respectively.

In the present invention, the fundamental mode field distribution of the optical fiber is dependent on parameters of the fiber core 11 and the downward-concave cladding layer 12. Thus, the fiber core 11 and the downward-concave cladding layer 12 are provided with appropriate parameter to ensure to have an enough low bending loss and mode field diameter. Thus, the parameters of the fiber core 11 and the downward-concave cladding layer 12 can be determined by the requirement of F=8.0~10.0 μm, where F=2(0.65+162V$^{-3/2}$+2.88V$^{-6}$)a$_1$, and $$V = \frac{2\pi a_1}{\lambda_0}(n_1^2 - n_2^2)^{1/2},$$

V denotes the normalized frequency, $\lambda_o$=1310 nm, and the normalized frequency satisfies: 2.9<V<5, the cutoff wavelength λc>1625 nm, wherein a$_1$ denotes the radius of the fiber core 11. Thus, the step-index optical fiber with such parameters is multi-mode guided and can support the guidance of high-order modes in its straight form in the communication wavelength range of 1260~1625 nm. The step-index optical fiber without any treatment can support both the fundamental mode transmission and the high-order mode transmission, namely, the step-index optical fiber is multi-mode guided at conventional communication window with a wavelength of 1.55 μm in a straight waveguide and thus becomes a few-mode step-index optical fiber. This results in modal dispersion in the optical fiber and thus produces an influence on the information transmission rate in the optical fiber. For this reason, in accordance with the present invention, defect layers are introduced into the cladding layer to form the defect modes. As a result, highly coupling is happened between the high-order modes in the fiber and the defect modes, accordingly forming strong mode leakage and leading to effectively single-mode guided operation. In order to reduce the effect of the defect mode on the bending loss of the fundamental mode of the core 11, namely the LP01 mode, the refractive index of the first upward-convex cladding layer 13 is lower than that of the fiber core 11 and is still lower than that of the fiber core 11 after the fiber is bent. As known from the equivalent formula of the straight waveguide of the curved straight waveguide, if the optical fiber is bent at +x direction, the middle portion at direction in the first upward-convex cladding layer 13 has index change value approximately represented by $0.78 n_3 d_c/R_b$. The refractive index of the first upward-convex cladding layer 13 should be $n_3 < n_{01}/(1+0.78 d_c/R_b)$, where the effective index of the LP$_{01}$ mode can be determined by $n_{01}=n_2(1+(1.1428-0.9960/V)^2(n_1-n_2)/n_1)$. The normalized frequency is determined by $$V = \frac{2\pi a_1}{\lambda_0}(n_1^2 - n_2^2)^{1/2}.$$

Where d$_c$ is defined as the distance between the center of the first upward-convex cladding layer 13 and the fiber core 11, and d$_c$=a$_1$+a$_2$+a$_3$/2, R$_b$=7.5 mm, where a$_2$, a$_3$ are radius width of the downward-concave cladding layer 12 and the first upward-convex cladding layer 13, respectively.

A large index difference between the fiber core 11 and the downward-concave cladding layer 12 is generated to form low bending loss of the LP$_{01}$ mode, and the refractive index of the outer cladding layer 15 is higher than that of the downward-concave cladding layer 12, thereby easily forming larger bending loss of the defect mode. Therefore, the relationship of the refractive indexes in the fiber should be: $n_1 > n_3 > n_4 > n_5 > n_2$.

The second upward-convex cladding layer 14 has an action for decreasing index difference between the defect layer and the outer cladding layer 15 and accordingly enhancing bending loss. The defect mode is presented in the first upward-convex cladding layer 13 in a direct waveguide status and the proportion of the second upward-convex cladding layer 14 is small. The radial width of the first upward-convex cladding layer 13 and the second upward-convex cladding layer 14 is generally required to be satisfied: 4≥a$_3$/a$_4$≥2, where a$_4$ denotes radial width of the second upward-convex cladding layer 14.

In order to increase the bending loss of the defect mode, the second upward-convex cladding layer 14 of the optical fiber has a parabolic structure. The index distribution along a radius r direction of the fiber is defined by $$n(r) = \sqrt{n_4^2 - (n_4^2 - n_5^2)((r-a_1-a_2-a_3)/a_4)^2}, \text{ where}$$
$$a_1+a_2+a_3+a_4 \geq r \geq a_1+a_2-a_3.$$

The optical fiber has a mode field diameter M of 8.6 μm~9.5 μm and thus is the same to the single-mode field distribution, thereby forming lower loss connection.

Preferably, the index difference between the fiber core 11 and the downward-concave cladding layer 12 satisfies: 0.015≥n$_1$−n$_2$≥0.0051; the index difference between the downward-concave cladding layer 12 and the first upward-convex cladding layer 13 satisfies: 0.006≥n$_3$−n$_2$≥0.0015; the index difference between the first upward-convex cladding layer 13 and the second upward-convex cladding layer 14 satisfies: 0.002≥n$_3$−n$_4$>0; the index difference between downward-concave cladding layer 12 and the outer cladding layer 15 satisfies: 0.003004≥n$_5$−n$_2$≥0.001.

The core radius a$_1$, width a$_2$ of the downward-concave cladding layer 12 and the thickness a$_3$ of the first upward-convex cladding layer 13 fall within the following ranges: 7.5 μm≥a$_1$≥4 μm, 8.5 μm≥a$_2$≥3.6 μm, and 15 μm≥a$_3$≥5.5 μm, respectively.

In accordance with the present invention, the optical fiber at the bending status can induce high mode coupling between the high-order modes in the fiber core 11 and the defect modes, accordingly leading to effectively single-mode guided operation. Bending loss of the LP$_{01}$ mode is lower enough and bending loss of the LP$_{11}$ mode is high enough within a specified bending radius range. In accordance with the present invention, the optical fiber can work at a bending radius lower than 7.5 mm and is able to remove the high-order mode in the optical fiber within a bending radius range of 7.5 mm~10 mm. Since the LP$_{11}$ mode is the lowest high-order mode, filtering it out can ensure that other high-order modes can also be filtered out. The bending loss of the optical fiber at a wavelength of 1550 nm satisfies: the bending loss of the LP$_{01}$ mode is less than 0.01 dB/turn at a bending radius R$_b$≥7.5 mm; and the bending loss of the LP$_{01}$ mode is larger than 1 dB/turn at a bending radius R$_b$≤10 mm.

Figure 2:
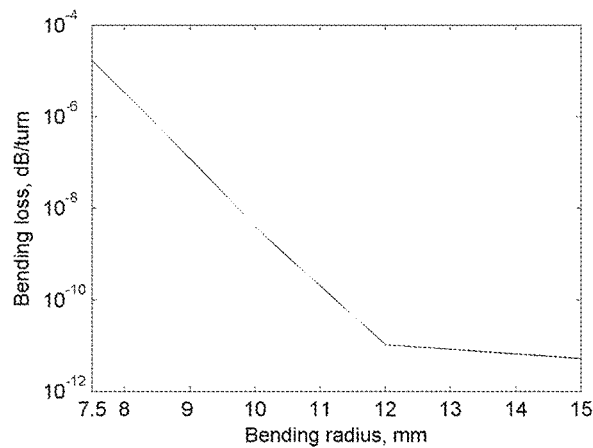
FIG. 2 is a schematic diagram of the bending loss of the $LP_{01}$ mode at the wavelength of 1.55 µm in a few-mode optical fiber depending on variations of bending, radius according to an embodiment of the present invention.

Referring to FIG. 2, it is a schematic diagram of the bending loss of the LP$_{01}$ mode at the wavelength of 1.55 μm in a few-mode optical fiber depending on variations of bending radius according to an embodiment of the present invention. It is shown from FIG. 2, the bending loss of the LP$_{01}$ mode is inversely increased with the decrease of the bending radius, but the bending loss is still achieved at a very low level.

Figure 3:
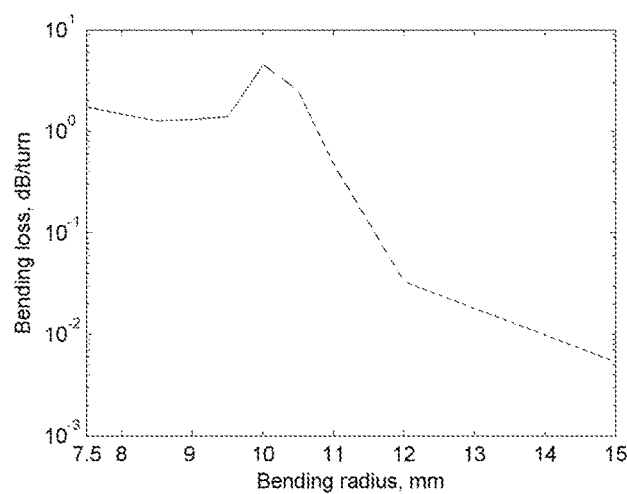
FIG. 3 is a schematic diagram of the bending loss of the LP11 mode at the wavelength of 1.31 µm in a few-mode optical fiber depending on variations of bending radius according to an embodiment of the present invention.

Referring to FIG. 3, it is a schematic diagram of the bending loss of the LIP$_{11}$ mode at the wavelength of 1.31 μm in a few-mode optical fiber depending on variations of bending radius according to an embodiment of the present invention. As shown in FIG. 3, the bending loss of the LP$_{11}$ mode has resonance peak indicating a status where the LP$_{11}$ mode is coupled with the defect mode. The bending loss of the LP$_{11}$ mode in the optical fiber larger than 1 dB/turn for bending radius R$_b$≥11 mm.

Figure 4:
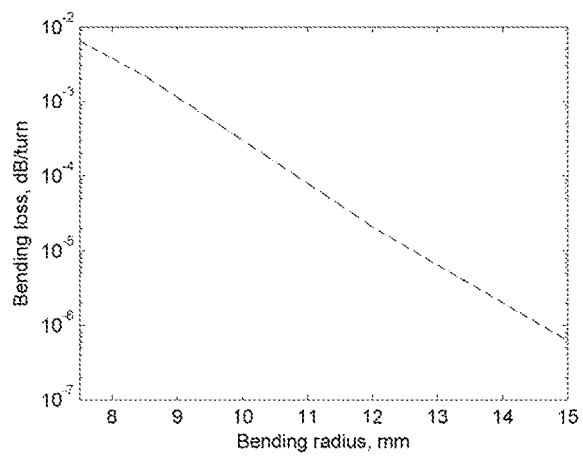
FIG. 4 is a schematic diagram of the bending loss of the LP01 mode in a few-mode optical fiber without the defect layers at the wavelength of 1.55 µm.
Figure 5:
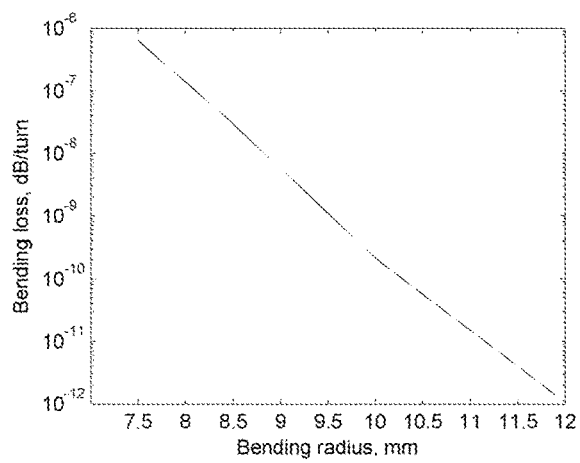
FIG. 5 is a schematic diagram of the bending loss of the LP11 mode in a few-mode optical fiber without the defect layers at the wavelength of 1.31 µm.

Referring to FIGS. 4 and 5, FIG. 4 is a schematic diagram of the bending loss of the LP01 mode in a few-mode optical fiber without the defect layers at the wavelength of 1.55 μm. FIG. 5 is a schematic diagram of the bending loss of the LP11 mode in a few-mode optical fiber without the defect layers at the wavelength of 1.31 μm. It is shown that the bending loss of the $LP_{11}$ mode and the $LP_{01}$ mode are inversely increased with the decrease of the bending radius in the optical fiber without the defect layers. Further, the bending loss of the $LP_{01}$ mode is too low to be filtered out by using a short fiber length. In contrast to FIG. 3, it is to be realized that the defect layer plays a significant role in increasing the mode loss of the $LP_{11}$ mode.

Figure 6:
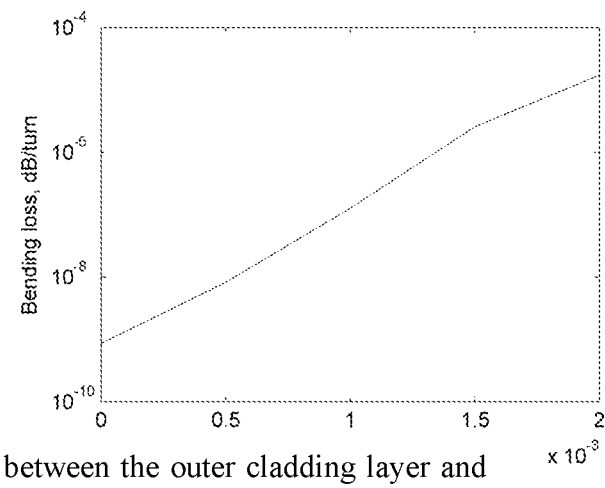
FIG. 6 is a schematic diagram of the bending loss of the LP01 mode in the few-mode optical fiber according to the present invention at the bending radius of 7.5 mm as a function of the index difference between the downward-concave cladding layer and the outer cladding layer $n_5-n_2$.
Figure 7:
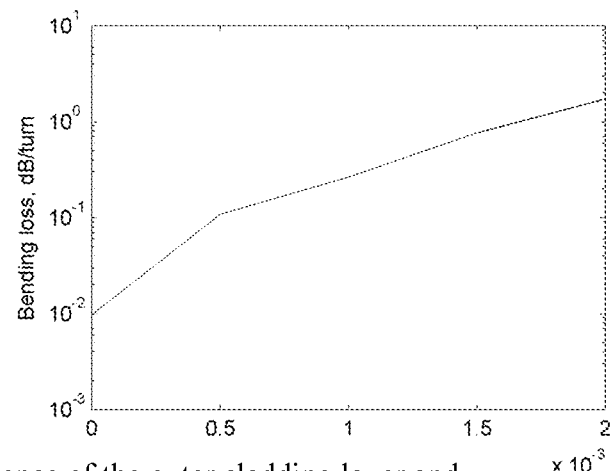
FIG. 7 is a schematic diagram of the bending loss of the LP11 mode in the few-mode optical fiber according to the present invention at the bending radius of 7.5 mm as a function of the LP01 mode varying dependence on the index difference $n_5-n_2$.

Referring to FIGS. 6 and 7, FIG. 6 is a schematic diagram of the bending loss of the $LP_{01}$ mode in the few-mode optical fiber according to the present invention at the bending radius of 7.5 mm as a function of the index difference between the downward-concave cladding layer and the outer cladding layer $n_5-n_2$. FIG. 7 is a schematic diagram of the bending loss of the $LP_{11}$ mode in the few-mode optical fiber according to the present invention at the bending radius of 7.5 mm as a function of the $LP_{01}$ mode varying dependence on the index difference $n_5-n_2$. It is shown that the bending loss of the $LP_{01}$ mode and the $LP_{11}$ mode are too small to achieve to filter out the $LP_{11}$ mode at an index difference of $n_5-n_2=0$. Accordingly, the bending loss of the $LP_{11}$ mode is effectively increased and the mode loss of the $LP_{01}$ mode is still much less by selecting appropriate value of $n_5-n_2$.

Embodiment 1

In the fiber core 11 with a core radius $a_1=4.4$ μm, the index difference between the fiber core 11 and the downward-concave cladding layer 12 $n_1-n_2=0.01$; the index difference between the downward-concave cladding layer 12 and the first upward-convex cladding layer 13 $n_3-n_2=0.004$; and the index difference between the first upward-convex cladding layer 13 and the second upward-convex cladding layer 14 $n_3-n_4=0.0005$; the index difference between the second upward-convex cladding layer 14 and the outer cladding layer 15 $n_4-n_5=0.0015$. The radius of the downward-concave cladding layer 12, the first upward-convex cladding layer 13, and the second upward-convex cladding layer 14 fall within the following values: $a_2=5$ μm, $a_3=10$ μm, $a_4=4$ μm. The mode field diameter at the wavelength of 1.310 μm is 8.8 μm. The bending loss of the $LP_{01}$ mode is lower than $1\times10^{-4}$ dB/turn at the bending radius of 7.5 mm. The bending loss of the $LP_{11}$ mode is lower than 1.7 dB/turn at the bending radius of 10 mm. In addition, the zero dispersion wavelength $\lambda_z$ is 1266 nm, and the dispersion slope is 0.102 ps/(nm²·km). The splicing loss with single-mode optical fiber is lower than 0.1 dB.

In addition, the optical fiber above mentioned is made from a similar manufacturing process as common single-mode fiber.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:
1. A few-mode optical fiber comprising:
a fiber core and a cladding layer surrounding the fiber core, wherein the refractive index of the fiber core is $n_1$;
the cladding layer comprising: a downward-concave cladding layer with a refractive index of $n_2$ surrounding the fiber core; a first upward-convex cladding layer with a refractive index of $n_3$ surrounding the downward-concave cladding layer, a second upward-convex cladding layer with a refractive index of $n_4$ surrounding the first upward-convex cladding layer, an outer layer with a refractive index of $n_5$ surrounding the second upward-convex cladding layer;
wherein the refractive indexes of the fiber core, the downward-concave cladding layer, the first upward-convex cladding layer, the second upward-convex cladding layer, and the outer layer satisfy: $n_1>n3>n_4>n_5>n_2$, the parameter between the fiber core and the downward-concave cladding layer is defined by F, with F=8.0 μm~10.0 μm, where $F=2(0.65+1.62V^{-3/2}+2.88V^{-6})a_1$, and

$$V = \frac{2\pi a_1}{\lambda_0}(n_1^2 - n_2^2)^{1/2},$$

where V denotes the normalized frequency, $a_1$ denotes the core radius, and $\lambda_0=1310$ nm and $2.9<V<5$.

2. The few-mode optical fiber according to claim 1, wherein the optical fiber has a cutoff wavelength of more than 1.625 μm.

3. The few-mode optical fiber according to claim 1, wherein the refractive index of the first upward-convex cladding layer meet the condition of $n_3<n_{01}/(1+0.78d_c/R_b)$, where $n_{01}=n_2(1+(1.1428-0.9960/V)^2(n_1-n_2)/n_1))$ and the normalized frequency:

$$V = \frac{2\pi a_1}{\lambda_0}(n_1^2 - n_2^2)^{1/2};$$

where $d_c$ is defined as the center distance between the fiber core and the first upward-convex cladding layer with $d_c=a_1+a_2+a_3/2$, and $R_b=7.5$ mm; where $a_2$, $a_3$ are the radial width of the downward-concave cladding layer and the first upward-convex cladding layer, respectively.

4. The few-mode optical fiber according to claim 1, wherein the index difference between the fiber core and the downward-concave cladding layer in the optical fiber falls within the following ranges: $0.015≥n_1-n_2≥0.0051$; the index difference between the downward-concave cladding layer and the first upward-convex cladding layer falls within the following ranges: $0.006≥n_3-n_2≥0.0015$; the index difference between the first and second upward-convex cladding layers falls within the following ranges: $0.002≥n_3-n_4>0$; and the index difference between the downward-concave cladding layer and the outer cladding layer falls within the following ranges: $0.004≥n_5-n_2≥0.001$.

5. The few-mode optical fiber according to claim 1, wherein core radius $a_1$, width of the downward-concave cladding layer $a_2$ and radial thickness of first upward-convex cladding layer $a_3$ fall within the following ranges: 7.5 μm≥$a_1$≥4 μm, 8.5 μm≥$a_2$≥3.6 μm, and 15 μm≥$a_3$≥5.5 μm.

6. The few-mode optical fiber according to claim 1, wherein radial widths of the first upward-convex cladding layer and the second upward-convex cladding layer should meet the condition of $4≥a_3/a_4≥2$, where $a_4$ is the radial width of the second upward-convex cladding layer.

7. The few-mode optical fiber according to claim 1, wherein the second upward-convex cladding layer has a parabolic structure, the refractive index distribution of the second upward-convex cladding layer at the radius r of the optical fiber satisfies:

$$n(r)=\sqrt{n_4^2-(n_4^2-n_5^2)((r-a_1-a_2-a_3)/a_4)^2}, \text{ where } a_1+a_2+a_3+a_4 \geq r \geq a_1+a_2-a_3.$$

8. The few-mode optical fiber according to claim 1, wherein the bending loss of the $LP_{01}$ mode in the optical fiber at a wavelength of 1550 nm is less than 0.01 dB/turn for bending radius $R_b \geq 7.5$ mm, and the bending loss of the $LP_{11}$ mode in the optical fiber is larger than 1 dB/turn for bending radius $R_b < 10$ mm.

9. The few-mode optical fiber according to claim 1, wherein the mode field diameter F of the optical fiber at a wavelength of 1310 nm is 8.6 μm~9.5 μm.

* * * * *